United States Patent [19]

Kraus et al.

[11] Patent Number: 5,108,607

[45] Date of Patent: Apr. 28, 1992

[54] FILTRATION MEMBRANES AND METHOD OF MAKING THE SAME

[75] Inventors: Menaham Kraus, Ann Arbor; Mark Heisler, Saline; Inessa Katsnelson, Ann Arbor; Diosie Velazques, Saline, all of Mich.

[73] Assignee: Gelman Sciences, Inc., Ann Arbor, Mich.

[21] Appl. No.: 596,221

[22] Filed: Oct. 12, 1990

Related U.S. Application Data

[63] Continuation of Ser. No. 463,250, Jan. 10, 1990, Pat. No. 4,964,990, which is a continuation of Ser. No. 52,699, May 20, 1987, Pat. No. 4,900,499.

[51] Int. Cl.$^5$ .............................................. B01D 69/02
[52] U.S. Cl. ................................ 210/500.39; 427/245

[58] Field of Search .............. 210/651, 500.39, 500.24, 210/500.41, 500.23; 264/41, 46, 210.5; 427/245, 246

[56] References Cited

U.S. PATENT DOCUMENTS 4,900,449  2/1990  Kraus et al. ...................... 264/41 X Primary Examiner—Frank Spear
Attorney, Agent, or Firm—Krass & Young

[57] ABSTRACT

Microporous membranes can be prepared which comprise a polymer which is a hydrophobic polymer in bulk form and which has an equilibrium water absorption from about 2% to about 4%, but is hydrophilic when precipitated as a membrane. The membranes are further characterized by high water flow rates at any given bubble point.

4 Claims, No Drawings

FILTRATION MEMBRANES AND METHOD OF MAKING THE SAME

REFERENCE TO RELATED APPLICATIONS

This application is a continuation of U.S. patent application Ser. No. 463,250, filed Jan. 10, 1990, now U.S. Pat. No. 4,964,990, which is a continuation of U.S. patent application Ser. No. 052,699, filed May 20, 1987, now U.S. Pat. No. 4,900,499, issued Feb. 13, 1990, which is a composite of co-pending U.S. patent application Ser. No. 050,052, filed May 13, 1987, now abandoned, and co-pending U.S. patent application Ser. No. 011,461, filed Feb. 2, 1987, now abandoned. U.S. patent application Ser. No. 050,052 is a continuation of U.S. patent application Ser. No. 897,045, filed Aug. 15, 1986, now abandoned, which is a continuation-in-part of U.S. patent application Ser. No. 812,260, filed Dec. 23, 1985, now abandoned. U.S. patent application Ser. No. 011,461 is a continuation of U.S. patent application Ser. No. 812,343, filed Dec. 23, 1985, now abandoned.

TECHNICAL FIELD

The instant invention relates to filtration membranes. These membranes can be used for the production of particle and bacteria free water or solutions. Such membranes are particularly useful in the electronic and pharmaceutical industries.

BACKGROUND ART

In aqueous microfiltration, such as the production of particle free water or solutions in the electronics and pharmaceutical industries, it is highly desirable to have membranes with as little leachable material as possible. Also, it is usually desired that the membranes be easily wettable by water or aqueous solutions. Therefore, membranes that are inherently water wettable (i.e., inherently water wettable as preformed membranes without having to be post-treated with a wetting agent). are often preferred over hydrophobic membranes post treated by a wetting agent. That is, it is common to manufacture hydrophilic membranes by adding a wetting agent, such as a surfactant, to preformed hydrophobic membranes. Upon use of the treated hydrophobic membranes, however, it is always possible that the wetting agent may be leached by the solution being filtered. Such leaching, in turn, may result in contamination of the filtrate.

At the present time, there are very few inherently wettable membranes that have been identified. Generally, these membranes are made of nylon. Examples of such membranes are disclosed in the U.S. Pat. Nos. 3,876,738 to Marinoccio et al, issued Apr. 8, 1975, and 4,340,479 to Pall, issued July 20, 1982.

Polymers which are inherently very hydrophilic are difficult to manufacture or have other drawbacks. Thus cellulose acetate membranes are limited in their heat and hydrolytic stability. Nylon membranes have to be made with solvent systems that are hazardous and hard to handle. Polymers which are even more hydrophilic such as polyvinyl alcohol, polyvinylpyrrolidone and the like are difficult or impossible to coagulate under practically feasible conditions because of their high affinity to water. Therefore, it is not generally convenient to make hydrophilic membranes out of highly hydrophilic polymers.

An ideal bulk polymer for a microfiltration membrane formation would be one which is inherently hydrophobic, to facilitate membrane formation, and would also impart desirable mechanical and thermal properties. However, the membrane made from such a polymer would also need to be inherently or easily water wettable by suitable means, e.g., by adding a wetting agent as noted above, such as a surfactant to facilitate aqueous filtration, but doing so in such a way as not to involve later aqueous leaching of the wetting agent and thus causing contamination of the filtrate.

This invention relates to a class of polymers surprisingly fulfilling these, apparently conflicting, requirements.

Polyamide, polyimide, polysulfone and polyethersulfone polymers have been used in the preparation of membranes. For example, U.S. Pat. No. 3,816,303 to Wrasidlo, issued Jun. 11, 1974, discloses a process for desalination of saline water by reverse osmosis using a membrane comprising a film of poly(N-amido)imides having a specific formulation. The Wrasidlo patent describes a reverse osmosis membrane made from specific polyimide structures. The reverse osmosis membranes have a porosity significantly different than those found in microporous membranes. Fully aromatic polyamides have been used to make reverse osmosis membranes as exemplified by U.S. Pat. No. 3,172,741 to Jolley. Polyimides have been developed for gas separating membranes, as disclosed in Japanese document JP 58 08,514.

Polyimide polymers are usually insoluble and need to be formed in situ (that is, the membranes need to be synthesized) in the polyamic acid form and then heat treated to form the final polyimide membrane. Aromatic polyamides are not easily available as a pure bulk polymer and therefore usually need to be synthesized by a membrane producer. Unlike the aforementioned polymers, polyamide-imide is commercially available at reasonable cost and is soluble in commonly used solvents.

The U.S. Pat. No. 3,719,640 to Lee et al, issued Mar. 6, 1973, discloses linear polymers of polyamide-imides having a specific formulation containing a quaternizable nitrogen atom. The quaternizing of the nitrogen is pH dependent. When the nitrogen is quaternized, the polymer is hygroscopic and may be used as separatory membranes in such processes as desalination.

The U.S. Pat. Nos. 3,855,122 to Bourganel, issued Dec. 17, 1974, and 4,286,015 to Yoshida et al, issued Sep. 28, 1982 disclose membranes made from polyaryl ethersulphones having specific structural formulations.

The Bourganel patent discloses an asymmetric membrane having a porosity in the reverse osmosis/ultrafiltration range. The Bourganel patent only discloses membranes made from sulfonated polysulfone. The Yoshida et al patent also discloses asymmetric ultrafiltration membranes made from polysulfone.

The U.S. Pat. No. 4,240,914 to Iwama et al, issued Dec. 23, 1980, discloses a membrane and process for making the same made from an aliphatic polyimide polymer.

None of the aforementioned patents disclose an intrinsically hydrophilic membrane having a porosity in the microporous range.

The Japanese patent document to Shou 54-26283 describes a method of making apparently microporous membranes from polysulfone polymers with high molecular weight polyethyleneglycol as an additive. Common micro-filtration membrane characterization tests (such as bubble points, bacteria retention) are not reported and no distinction is made between the various possible polysulfones.

The present invention provides a membrane made of a hydrophobic polymer which, independent of pH, is surprisingly water wettable in a microporous membrane structure.

SUMMARY OF THE INVENTION

In accordance with the present invention, there is provided a microporous membrane which comprises a polymer selected from a group of polymers which are characterized in that they are: 1) inherently hydrophobic in bulk form, and 2) hydrophilic as the polymerized membrane or hydrophilic as the polymerized membrane when containing 1 to 6 percent by weight polyethyleneglycol. The instant invention further provides a method of making the microporous membrane comprising the steps of dissolving the aforementioned polymer in a solvent to form a polymer solution, forming a thin film of the polymer solution, precipitating the polymer as a microporous membrane, and drying the microporous membrane.

DETAILED DESCRIPTION OF THE INVENTION

The solubility parameter of polymers measures the cohesive energy per unit volume and is generally associated with polarity. The greater the polar character of the polymer's functional groups, the higher the solubility parameter. For this reason, it is the usual observation that polymers with higher solubility parameters are more wettable (have lower contact angles with water, a highly polar liquid). However, this order seems to be reversed in some of the subject polymers characterizing the instant invention. For example, membranes made of polyethersulfone, with a solubility parameter of 20.6 MJ/m$^3$, are more wettable than polysulfone membranes with a solubility parameter of 21.7 MJ/m$^3$, as disclosed in the U.S. Pat. No. 4,387,187 to Newton issued Jun. 7, 1983.

The present invention is the first instance in microfiltration membrane applications in which a clear advantage of one of these polymers over the other has been identified. It is another surprising aspect of this invention that this advantage is revealed only in the microporous range of porosity.

The membrane according to the instant invention has a microporous porosity and comprises a polymerized polymer selected from a group of polymers which are characterized in that they are: 1) inherently hydrophobic in bulk form, and 2) hydrophilic when precipitated as a membrane or hydrophilic when precipitated as a membrane when containing 1 to 6 percent by weight polyethyleneglycol, the membrane having a porosity in the microfiltration range.

The polymer may be characterized as being hydrophobic in bulk form. The bulk or powdered form of the polymer is non-wettable or "water repelling". When precipitated into a membraneous form in the microfiltration range, these membranes are hydrophilic or spontaneously wettable or hydrophilic or spontaneously wettable when they contain 1 to 6 percent by weight of polyethyleneglycol.

This definition is not limiting of the characteristics of the membrane, as other reagents will accomplish the same function as the polyethyleneglycol where needed. Rather, this limitation is useful in characterizing the polymer from which the membrane is made. However, upon complete extraction of the polyethyleneglycol from the membrane, the membrane remains as a completely functioning membrane which is sometimes no longer hydrophilic. On the other hand, a similar amount of polyethyleneglycol in membranes made from structurally similar polymers, for example polysulfone, does not produce a wettable membrane. Hence, the properties of the membrane made in accordance with the subject invention are completely unexpected.

A common measure of hydrophobicity of polymers is water absorption by the bulk polymer within 24 hours or at equilibrium as set out in ASTM D570 (standard method to measure water absorption by polymers). There is, however, no commonly agreed definition of hydrophobic and hydrophilic polymers. We define a hydrophobic polymer as one absorbing less than 0.5% of its weight of water within 24 hours, and 4% or less at equilibrium. The surface of a solid piece of such a polymer will typically not wet, and a water drop placed on such an inclined surface will roll off without tailing.

Literature data on the water absorption of a number of polymers is given in the following table.

TABLE I

| Water Absorption of Polymers (Source: Modern Plastics Encyclopedia 1985) | | |
|---|---|---|
| Polymer | 24 Hour (%) | Saturation (%) |
| PTFE | 0.01 | |
| Polyacrylonitrile | 0.3 | |
| Polyetherimide | 0.25 | 1.25 |
| Thermoplastic polyimide | 0.24 | |
| Polyamide-imide | 0.28 | 4.0 |
| Polysulfone | 0.3 | 0.7 |
| Polyethersulfone | 0.4 | 2.5 |
| Aromatic polyamide | 0.4 | 4.2 |
| Nylon 66 | 1.1 | 8.5 |
| Cellulose acetate | 2.7 | |

By the above definition, polyetherimide, polysulfone, and polyethersulfone are hydrophobic while nylon 66, aromatic polyamide and cellulose acetate are hydrophilic.

The polymers used for the membranes of the present invention are characterized by a specific set of properties. They are hydrophobic according to the above definition, but they form hydrophilic, spontaneously wettable microporous membranes or hydrophilic, spontaneously wettable microporous membranes when the membranes are made so as to contain polyethyleneglycol or other polymer additives.

U.S. Pat. No. 4,413,074 to Brunswick Corp. describes a post treatment for preformed porous polysulfone membranes to render them water wettable. It is emphasized in that patent that the treatment is especially suitable to polysulfone. In fact, with polysulfone membranes this treatment or addition of substantial amounts of surfactants is absolutely necessary for wettability. With polyethersulfone, however, in the context of the present invention, much milder and simpler means can be used to make the membrane wettable. These could be, for example, inclusion of some polyethyleneglycol in the membrane or inclusion of small amounts of polyvinylpyrrolidone in the membrane matrix.

We define microporous membranes as membranes having pore size ratings of 0.02 um to 20 um. Such membranes will not reject salts from feed solutions nor will they retain dissolved high molecular weight substances such as proteins. We define wettability as spontaneous absorption of water into at least 50% of the exposed membrane area within not more than 10 seconds when the membrane is placed onto the surface of stagnant water.

We have found that polymers fulfilling the requirements of the present invention will typically have 24 hour water absorption of about 0.2 to 0.4% and equilibrium water absorptions of more than about 2% but less than about 4%. More specifically, in order to determine whether a polymer is suitable and falls within the definition of the present invention, the following test, useful in characterizing the membrane, is applied (herinafter called the Test Method).

The Test Method

A hydrophobic polymer according to the above definition is dissolved in a polar aprotic solvent such as dimethylformamide, dimethylacetamide, or N—methyl pyrrolidone. Polyethyleneglycol 400 (PEG) is added and the mixture is stirred to homogeneity. Concentrations are adjusted so that the polymer is about 10 to 13% of the mixture, solvent is about 17 to 20% and PEG is about 65 to 70%. The mixture is cast at a thickness of about 10 mils onto a clean glass plate and subjected to about 50-80% relative humidity air at ambient temperature until the film becomes opaque. The membrane is then immersed into ambient water overnight to wash out solvents, and dried in ambient air two hours and in a 70° C oven for one hour. Membranes made this way will have porosity in the microporous range and will typically contain 2 to 6% residual PEG. Polymers according to the present invention are characterized by the microporous membrane prepared as described above as being spontaneously wettable.

The Test Method as described will reveal surprising differences amongst apparently similar polymers. After studying Table I it is not surprising that nylon 66 membranes are inherently wettable. However, it is surprising and unexpected that polymers with much lower water absorptions will form wettable membranes. Even more surprising, polymers which are very similar in chemical composition and water absorption will give membranes with different wettability properties. Polymers according to this invention include, but are not limited to, aromatic polyethersulfones, preformed polyimides, and polyamide-imides derived from fully aromatic polyacids.

One preferred polyethersulfone polymer of the present invention is polyethersulfone (sold under the tradename Victrex ™ ). Its molecular structure,

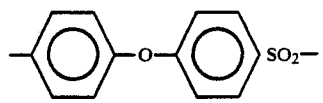

is very similar to that of polysulfone (sold under the tradename Udel ™ ):

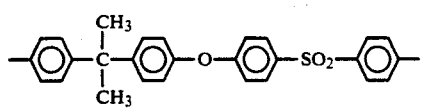

Table I shows that the two polymers have quite similar water absorption properties in bulk form and both are hydrophobic. Still, only polyethersulfone will provide wettable microporous membranes by the aforementioned Test Method, while polysulfone will give hydrophobic membranes. Polysulfone and polyethersulfone have often been mentioned together or in similar contexts in the open and patent literature, especially in the context of ultrafiltration membranes.

It is implied in these references that membranes from both polymers behave identically in the ultrafiltration range of porosity. For example, a number of methods have been devised to make both polysulfone and polyethersulfone ultrafiltration membranes wettable. In this tighter range of porosity, neither membrane is spontaneously wettable. References on point are U.S. Pat. No. 3,651,030 to Desauliners, issued Mar. 21, 1972, U.S. Pat. No. 3,632,404 to Desauliners, issued Jan. 4, 1972, German patent 2,829,630 and Japanese patent 8,250,507. A recent publication pointed out the better heat stability of polyethersulfone ultrafiltration membranes. (Kai et al AVCS Syrup Series 281, p. 281, p. 21, 1985).

Similar to the relationship between polyethersulfone and polysulfone, polyether imide, polyamide-imide and thermoplastic polyimide have similar water absorption properties in bulk form, but only the latter two provide hydrophilic microfiltration membranes.

Apparently, subtle differences in the hydrophobicity of polymers are revealed much more quickly and visibly when made into high surface morphologies such as microporous membranes. Such differences have not been noticed before and are the basis for the Test Method of the present invention.

Referring specifically to the aforementioned group of polymers, preferably, the aromatic polyether is a polyethersulfone having the recurring group

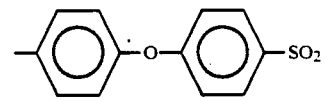

This particular polyethersulfone may be purchased under the trade name "Victrex" ™ . This polyethersul generally resistant to aliphatic alcohols, some chlorinated hydrocarbons, and some aromatic hydrocarbons.

Preferably, the polyimide includes the recurring group

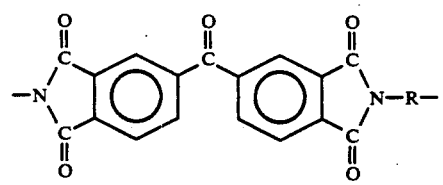

wherein 10% to 90% of the R groups are

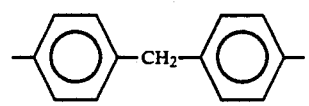

and the remaining R groups include either

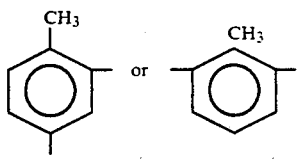

Such polyimide is sold by Upjohn Company under the trade name "Polyimide 2080" TM. Polyimide 2080 is resistant to most organic solvents and dilute acids. However, polyimides are not recommended for long term exposure to caustic solutions, including ammonia and hydrazine.

Preferably, the polyamide-imide is a compound sold by Amoco Corporation under the trade name "Torlon" TM. The molecular structure of the polymer consists essentially of the following repeating unit:

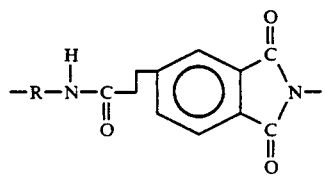

where R is largely aromatic. Polyamide-imide is available at a reasonable cost, and is soluble in commonly used solvents such as N,N dimethylformamide (DMF) or N-methylpyrrolidone. Generally, the polyamide-imide is unaffected by aliphatic and aromatic hydrocarbons, chlorinated and fluorinated hydrocarbons, and most acids and bases. It is attacked by some high temperature caustic systems and high temperature acid systems.

Other polymer additives can be used in the Test Method in addition to polyethyleneglycol. Regarding polyethersulfone, we have found that polyethersulfone membranes can be made wettable by a variety of simple means. Thus, in addition to membranes made according to the Test Method, small amounts of polyvinylpyrrolidone (for example, less than 1% of the polyethersulfone weight) can be incorporated into the membrane. Microporous membranes made this way will stay completely wettable even after exhaustive extraction with water or alcohols, or extensive heat treatments. Much higher concentrations of polyvinylpyrrolidone are necessary to make polysulfone membranes wettable.

The instant invention further provides a method of making a microporous membrane including the steps of dissolving a polymer in a suitable solvent such as dimethylformamide to form a polymer solution, the polymer being selected from the group of polymers which are inherently hydrophobic in bulk form and hydrophilic as a microporous membrane or hydrophilic as 1-6% PEG containing polymerized membranes having microporosity in the microfiltration range. A thin film is formed of the polymer solution. The polymer is precipitated as a microporous membrane and dried.

A suitable plasticizer may be added to the polymer solution. Examples of suitable plasticizers are glycerine or polyethyleneglycol. For example, the ratio of the mixture of ingredients may be:
polymer 12%
PEG/glycerine 68%
solvent 20%

Polyethyleneglycol can also be used as a pore forming agent.

Preferably, when the polymer is polyamide-imide the solution includes 11% to 15% by weight polyamide-imide, 40% to 45% by weight DMF and 44% to 48% by weight PEG.

Generally, the polymer solution is cast on a moving belt and subjected to conditions of controlled air velocity, belt temperature, and relative humidity. The liquid film of the polymer imbibes sufficient water to affect initial precipitation of the polymer from the solvent. Final precipitation, which forms the microporous membrane, occurs in a quench bath which contains a strong nonsolvent such as water. The formed microporous membrane may subsequently be dried in an oven.

Preferably, the solution for microfiltration membranes is cast on a flat surface at a 10 to 12 mil thickness. The solution is allowed to coagulate under a 60% to 70% relative humidity ambient air.

Once coagulation is completed, the solvent is removed by immersing the membrane in a nonsolvent to leach the solvents out. During this time, coagulation can also be completed. The nonsolvent may be water, as well as other polar solvents in which the polymerized membrane will remain stable while the PEG and DMF will dissolve.

Once coagulation and leaching of the excess solvents are completed, the membrane is dried. Preferably, the membrane is dried at a temperature ranging from ambient to 70° C.

Pursuant to the method discussed above, the membranes may be made on either a small or large scale. Large scale manufacturing can be accomplished by casting the membrane on an endless belt and leaching the solvent from the formed membrane in large size water baths.

As a further illustration, the polyamide-imide membrane made to include pores having a size rating in the microfiltration range of between about 0.02 microns to about 20 microns is inherently wettable, having excellent water permeation rates and having exceptional thermal stability. This is surprising since the polymer per se is hydrophobic in the bulk resin form. However, as shown in the examples, these formed membranes show water flow rates comparable to or better than those of the best commercial microfiltration membranes. Thermal stability is far superior to that of available membranes, thus offering new potential applications for microfiltration membranes.

The microfiltration membranes made in accordance with the instant invention are very useful for aqueous filtrations. If necessary, the polyamide-imide membrane can also be made hydrophobic by post treatments, such as by application of silicone compounds. The posttreatment of the silicone compound is throughout the pore surfaces of the membrane thereby making the membrane hydrophobic on its interior pore surfaces as well as on the outer surface of the membrane. These microporous membranes can be subjected to temperatures of 250° C. and higher for extended periods of time without major changes in filtration performance.

The polyamide-imide microporous membranes show excellent water flow versus bubble point characteristics. The mechanical and hydrolytic properties of these membranes can be substantially improved by heat curing of the membrane. By curing the membrane at 260° C. for 4 to 20 hours, tensile strength increases at least 50%. In addition, the hydrolytic stability improves to the extent that the membrane can withstand repeated autoclavings and steamings. Alternatively, the curing can be done on the resin before it is made into a membrane with similar results. Heat curing has little effect on flow properties of the membranes.

Membranes can be manufactured from either cured or uncured polymer. Either type of membrane can be made into devices such as capsules and cartridges by pleating and sealing of the membranes.

The following examples illustrate the invention in greater detail. Since the following examples are for the purpose of illustrating the invention, they shall not be construed as limiting the invention in any way.

EXAMPLES

Definitions

| | |
|---|---|
| Water bubble point: | The water bubble point is a test to measure the largest pore size of a filter, based on the air pressure necessary to force liquid from the pores of a wetted filter. The larger the pore, the less pressure to vacate it. Air passing through the empty pore is detected as bubbles. The differential pressure to force the first bubble out is defined as the bubble point. The relationship between the bubble point pressure and the diameter of the large pores is given by: $$P = \frac{B \gamma \cos \theta}{D}$$ where B is a constant, $\gamma$ is liquid air surface tension, $\theta$ is the liquid solid contact angle and D is pore diameter. |
| Air flow: | Air flow depends chiefly on the differential pressure, and on the total porosity and area of a filter. The total amount of air that can be filtered is also a function of contamination in the flow. The Gurley and Frazier tests are two common measurements of filter air flow. |
| Water flow: | The water flow/flux test measures the rate at which water will flow through a filter - a variable of differential pressure, porosity, and filter area. Flow rates are commonly expressed in either gallons/minutes/foot squared or mililiters/minute/centimeter squared at a given pressure. |

Example 1

Polyethersulfone Membrane 0.2u

Polyethersulfone (Victrex TM 5200) dimethylformamide and polyethyleneglycol 400 were mixed in the ratio 13:18:69. the mixture was stirred to homogeneity and cast at 10-12 mil on glass or stainless steel. It was subjected to 60-70% relative humidity ambient air until it became opaque. The film was then immersed in water to complete coagulation and leach out excess solvent, for 2-12 hours. It was then dried at ambient to 70° C.

The membrane obtained was spontaneously water wettable. It exhibited 100% bacteria retention when challenged with $10^7/cm^2$ of *Pseudomonas dimunitae*. The membrane had the following flow characteristics:
Kerosene Bubble Point: 22 psi
Water Bubble Point : 53 psi
Air Flow : 2.7 lit/$cm^2$-min at 10 psi
Water Flow : 23 ml/$cm^2$-min at 10 psi Nuclear magnetic resonance of the dissolved membrane showed that it contained 5% by weight of polyethylene-glycol.

COMPARATIVE EXAMPLE 1

Polysulfone Membrane 0.2 u

A polysulfone (Udel TM 3500) membrane was made by a procedure essentially the same as in Example 1.

Nuclear magnetic resonance of the dissolved membrane showed that it contained 6% polyethyleneglycol. However it was totally hydrophobic.
Membrane performance was:
Kerosene Bubble Point: 34 psi
Water Flow : 17.8 ml/$cm^2$-min at 10 psi
(After prewetting with ethanol)

EXAMPLE 2

Polyethersulfone Membrane 0.45 u

A casting solution was prepared by mixing 11.5% polyethersulfone (Victrex TM 5200) with 25% N-methyl-pyrrolidone, 68% polyethyleneglycol, and 0.5% glycerine. The membrane was cast and set as in Example 1. The membrane obtained was spontaneously water wettable.
Flow characteristics were:
Kerosene Bubble Point: 17 psi
Water Bubble Point : 36 psi
Air Flow : 4 8 lit/$cm^2$-min at 10 psi
Water Flow : 42 ml/$cm^2$-min at 10 psi

EXAMPLE 3

Polyethersulfone Membrane 0.1 u

A casting solution was prepared by mixing 15% polyethersulfone (Victrex TM 5200) with 18% dimethylformamide, 66.5% polyethyleneglycol and 0.5% glycerine. The membrane was cast and formed as outlined in Example 1. The membrane obtained was spontaneously water wettable. Performance was as follows.
Kerosene Bubble Point: 37.5 psi
Water Bubble Point : 88.8 psi
Air Flow : 1.7 lit/$cm^2$-min at 10 psi
Water Flow : 9 ml/$cm^2$-min at 10 psi

EXAMPLE 4

Polyamide-Imide Membrane 0.2 u

Polyamide-imide (Torlon TM 4000TF), N,N-dimethylformamide and polyethyleneglycol were mixed in the ratio of 11.5:40:48.5. The mixture was stirred to homogeneity and cast at a 10-12 mil thickness on glass or a stainless steel belt as in Example 1. The cast solution was subjected to 60-70% relative humidity ambient air until phase separation occurred. The immersed in water to complete coagulation and leach out excess solvents. The membrane was then dried at ambient to 70° C.

The membrane was spontaneously wetted when placed onto the surface of stagnant water. It showed the following performance characteristics.
Kerosene bubble point : 23 psi
Water bubble point : 54 psi
Air flow : 2.3 lit/$cm^2$-min at 10 psi
Water flow : 19 ml/$cm^2$-min at 10 psi

EXAMPLE 5

Polyamide-Imide Membrane 0.45 u

A casting mixture was prepared by mixing 11.5% polyamide-imide (Torlon TM 4000TF) with 44% dimethylformamide and 44.5% polyethyleneglycol 400. A membrane was cast and set essentially as described in Example 4. The membrane obtained was inherently wettable and showed the following characteristics:
Kerosene bubble point : 13 psi
Water bubble point : 30 psi
Air flow : 4.5 lit/cm²-min at 10 psi
Water flow : 36 ml/cm²-min at 10 psi

EXAMPLE 6

Polyamide-Imide Membrane 3 u

A casting mixture was prepared consisting of 8% polyamide-imide (Torlon ™ 4000TF), 45% dimethylformamide and 47% polyethyleneglycol 400. A membrane was cast and formed as set essentially out in Example 4. The membrane obtained was inherently hydrophilic and exhibited the following characteristics:
Kerosene bubble point : 2.4 psi
Water bubble point : 6.2 psi
Air flow : 219 lit/cm²-min at 10 psi
Water flow : 144.6 ml/cm²-min at 10 psi

COMPARATIVE EXAMPLE 6

Polyether-Imide Membrane

A casting mix was prepared as in Example 6 except polyether-imide (Ultem ™ 1000) was used instead of polyamide-imide. Kerosene bubble point was 3.5 psi and the membrane was totally hydrophobic.

EXAMPLE 7

Thermoplastic Polyimide Membrane

A mixture was prepared consisting of 13% thermoplastic polyimide (Upjohn 2080D), 40% dimethylformamide, ethyleneglycol, 8% tetrahydrofuran and 27% N-methyl-pyrrolidone (by weight). The solution was cast and set up as in Example 1. The membrane obtained was wettable and showed the following performance:
Kerosene Bubble Point : 20.8 psi
Air Flow : 2.0 lit/cm²-min at 10 psi
Water Flow : 9.9 ml/cm²-min at 10 psi

EXAMPLE 8

Thermoplastic Polyimide Membrane

A solution was prepared containing 13% thermoplastic polyimide (Upjohn 2080D), 46% dimethylformamide, 6% ethyleneglycol, 2% tetrahydrofuran and 33% N-methyl-pyrrolidone (by weight).

A membrane was prepared as in Example 1. The membrane obtained was water wettable and showed the following performance characteristics:
Kerosene Bubble Point : 14.6 psi
Air Flow : 3.8 lit/cm²-min at 10 psi
Water Flow : 23.7 ml/cm²-min at 10 psi

EXAMPLE 9

Heat Stability of Polyamide-Imide Membrane

Membrane samples made in accordance with the instant invention were subjected to heat treatment in an oven at different temperatures and for different periods of time. Performance was measured before and after treatment with the following results.

| Treatment | Water BP psi | Air Flow l pm/5 psi | Water Flow ml/min-cm² | Wetting |
|---|---|---|---|---|
| None | 9.8 | 40 | 400 | Instant |
| 210° C./16 hr | 10.6 | 43 | 400 | Instant |
| 240° C./5 hr | 9.9 | 41 | 385 | Instant |
| 280° C./3 hr | 9.0 | 46 | 360 | Instant |

EXAMPLE 10

Effect of Heat Curing on Polyamide-Imide Membrane Properties 0.45 um membranes were heat cured at 269° C. for 20 hours. They were then repeatedly autoclaved at 118° C. for 20 minutes and typical performance and mechanical characteristics measured. Results summarized in the following table show that the membranes are little affected by the autoclaving.

| Treatment | Tensile Strength (psi) | Elongation at Break (%) | Bubble Point (H₂O, psi) | Water Flow (ml/cm²/min) |
|---|---|---|---|---|
| None | 730 | 8.4 | 23 | 77 |
| Cured | 1700 | 6.8 | 24 | 84 |
| Autoclave (1 cycle) | 1300 | 10.2 | 23 | 80 |
| Autoclave (2 cycles) | — | — | 23 | 80 |
| Autoclave (3 cycles) | — | — | 22 | 78 |
| Autoclave (4 cycles) | 1900 | 8.2 | 22 | 75 |

EXAMPLE 11

Blend Polyethersulfone Membrane

A membrane was prepared as in Example 1, except that polyvinylpyrrolidone was substituted for 0.7% of the polyethersulfone weight. The membrane obtained was inherently wettable and, unlike the membrane of Example 1, retained its wettability upon exhaustive extraction with isopropanol or extended exposure to 170° C. in an oven. Polysulfone membranes needed substantially higher concentrations of polyvinylpyrrolidone to induce similar wettability.

EXAMPLE 12.

Post Treated Polyethersulfone Membrane

A membrane was prepared as in Example 1. The membrane was then post treated with a dilute aqueous solution of polyvinylalcohol and was subsequently cross-linked. This membrane retained wettability after prolonged extraction in isopropanol and extended heat treatment as in Example 11.

The results indicate that the invention provides increased flow and throughput. It has also been found that the instant invention provides good temperature properties and handling, resulting in increased practicality for use.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims the invention may be practiced otherwise than as specifically described.

What is claimed is:

1. A microporous membrane comprising a polyamide-imide polymer and a polymer additive selected from polyethyleneglycol and polyvinylpyrrolidone, which membrane is hydrophobic in bulk form and has an equilibrium water absorption ranging from about 2% to about 4% and is blended in casting solution and cast in a thin film to make the membrane inherently water wettable when formed and dried, with a pore size range such that the membrane does not retain or reject dissolved proteins or salts from aqueous feed solutions, the formation of said membrane comprising the step of being subjected to heat curing for a time ranging from 3 to 20 hours and at a temperature ranging from 210° C. to 269° C. to increase its tensile strength and improve its hydrolytic stability to enable it to withstand repeated autoclaving and steaming while retaining water wettability and flow properties.

2. The membrane of claim 1 wherein the heat curing is done on the polymer resin before it is made into a membrane.

3. The membrane of claim 1 wherein the heat curing is done on the formed and dried membrane.

4. The membrane of claim 1 wherein the casting solution comprises polyamide-imide, DMF and PEG.

* * * * *

UNITED STATES PATENT AND TRADEMARK OFFICE
CERTIFICATE OF CORRECTION

PATENT NO. : 5,108,607
DATED : April 28, 1992
INVENTOR(S) : Kraus, et al It is certified that error appears in the above-identified patent and that said Letters Patent is hereby corrected as shown below:

Column 1, line 39, delete "agent). are" and insert --agent) are--;

Column 6, line 45, delete "polyethersul" and insert --polyethersulfone--;

Column 9, line 52, delete "the mixture" and insert "The mixture--;

Column 10, line 26, delete "4 8 lit" and insert --4.8 lit--;

Column 10, line 51, delete "The immersed" and insert --The membrane was then immersed--.

Signed and Sealed this

Tenth Day of August, 1993

Attest:

MICHAEL K. KIRK

*Attesting Officer*     *Acting Commissioner of Patents and Trademarks*